United States Patent [19]

Kidawara et al.

[11] Patent Number: 4,482,050

[45] Date of Patent: Nov. 13, 1984

[54] FILM CASSETTE

[75] Inventors: Atsushi Kidawara; Kazunari Kobayashi, both of Tokyo, Japan

[73] Assignee: Olympus Optical Co., Ltd., Tokyo, Japan

[21] Appl. No.: 524,124

[22] Filed: Aug. 16, 1983

[30] Foreign Application Priority Data

Aug. 24, 1982 [JP] Japan .................... 57-127703[U]

[51] Int. Cl.³ .................... B65D 85/67; B65D 85/671; B65H 75/28

[52] U.S. Cl. .................... 206/389; 206/804; 242/71.2; 242/1

[58] Field of Search .................... 206/389, 804, 369; 242/71.2, 1

[56] References Cited

U.S. PATENT DOCUMENTS

| | | | |
|---|---|---|---|
| 935,420 | 9/1909 | Smith | 206/369 |
| 2,743,081 | 7/1973 | Roberg et al. | 206/387 |
| 4,145,012 | 3/1979 | Mitsui | 242/71.2 |
| 4,207,979 | 6/1980 | Brown | 206/804 |

Primary Examiner—William T. Dixson, Jr.
Attorney, Agent, or Firm—Frishauf, Holtz, Goodman & Woodward

[57] ABSTRACT

A film cassette includes a first cylindrical body forming a film supply section, a second cylindrical body forming a film take-up section, and a coupling section extending between the first and second cylindrical bodies and connected at both ends to the two cylindrical bodies thereby integrally coupling the cylindrical bodies. The coupling section has an outer face continuous with the outer peripheral surfaces of the first and second cylindrical bodies. First cylindrical body includes a ridge protruding from the outer peripheral surface thereof, to which is applied an urging force to rock the film cassette around that cylindrical body with the ridge thereon.

6 Claims, 5 Drawing Figures

FILM CASSETTE

BACKGROUND OF THE INVENTION

The present invention relates to a film cassette removably set in the cassette holder of a camera.

Conventionally known is a film cassette which is so designed that a first cylindrical body forming a film supply section and a second cylindrical body forming a film take-up section are connected by a coupling section whose outside face is tangentially arranged with reference to the respective outer peripheral surfaces of the first and second cylindrical bodies. The film cassette of this type is set in a cassette holder or chamber defined within a camera, and the unexposed film delivered from the film supply section is led to a film passage defined within the coupling section. The film is exposed at the couping section and is then wound by the film take-up section.

An opening section for cassette loading/unloading is so provided on the back of the camera that the film cassette is loaded and unloaded at the rear side of the camera. In taking the film cassette out of the cassette holder, however, it is hard to pick up the film cassette between ones fingers, since only the outside face portion of the film cassette is exposed at the cassette loading/unloading opening section. Accordingly, the film cassette in the cassette holder may be dropped by the force of gravity, by turning the camera upward. However, it would be difficult to do this if the camera were connected with, for example, an endoscope. Alternatively, one end of a tape may be attached in the vicinity of the opening section, so that the intermediate portion of the tape is pushed into the bottom portion of the cassette holder by the film cassette, with the other end of the tape being exposed on the opening section side, when the film cassette is set into the cassette holder. In this case, the film cassette might be taken out of the cassette holder by pulling the other end of the tape to lift the film cassette off the bottom of the cassette holder. This method, however, is subject to a defect, in that the cassette loading would be troublesome.

SUMMARY OF THE INVENTION

The object of the present invention is to provide a film cassette capable of being easily taken out, from the rear side of a camera, without the inconvenience of a complicated loading operation.

BRIEF DESCRIPTION OF THE DRAWINGS

FIGS. 1 to 3 show a film cassette according to one embodiment of the present invention, in which FIG. 1 is a general perspective view, FIG. 2 is a schematic view of a camera with a film cassette set within the cassette holder thereof, and FIG. 3 is a schematic view showing the way the film cassette is taken out of the cassette holder.

DETAILED DESCRIPTION OF THE PREFERRED EMBODIMENT

A film cassette according to one embodiment of the present invention may now be described, with reference to the accompanying drawings.

Figure 1:
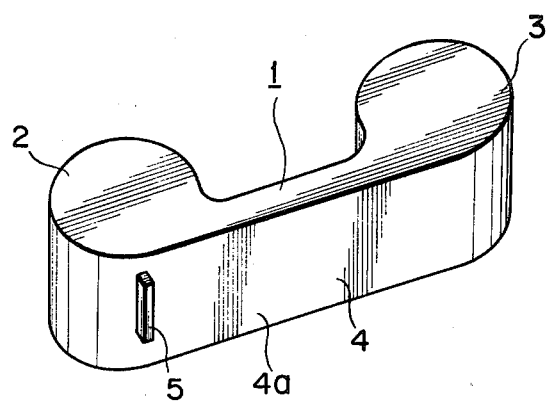

In FIG. 1, numeral 1 designates a film cassette which comprises a first cylindrical body 2 forming a film supply section, a second cylindrical body 3 forming a film take-up section, and a flat coupling section 4 connecting the two cylindrical bodies 2, 3. The coupling section 4 has a flat outside face 4a tangentially arranged with reference to the respective peripheral surfaces of the first and second cylindrical bodies 2, 3. A film passage (not shown) is defined within the coupling section 4, extending in the longitudinal direction thereof. A vertically extending plastic ridge (catch portion) 5 is integrally formed on that peripheral surface portion of the first cylindrical body 2 which is flush with the outside face 4a of the coupling section 4.

Figure 2:
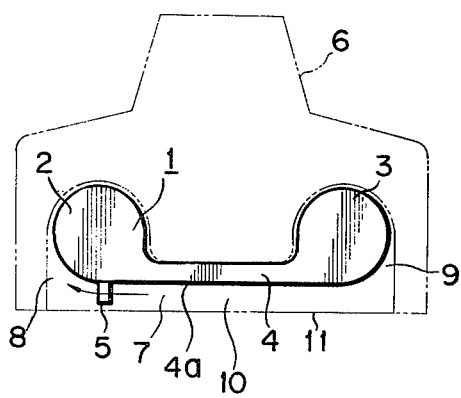

As shown in FIG. 2, a cassette holder 7 is formed within a camera 6. The cassette holder 7 is formed of substantially cylindrical first and second holding spaces 8, 9 which are so spaced as to hold the first and second cylindrical bodies 2, 3, respectively, as well as a substantially rectangular third holding space 10 located between the first and second holding spaces 8, 9, to hold the coupling section 4. On the back of the camera 6, an opening section 11 for cassette loading/unloading, serving as an opening of the cassette holder 7, is formed over the entire rear face of the cassette holder 7. A cover (not shown) is swingably attached to the back of the camera 6, so that the opening section 11 can be opened and closed.

Figure 3:
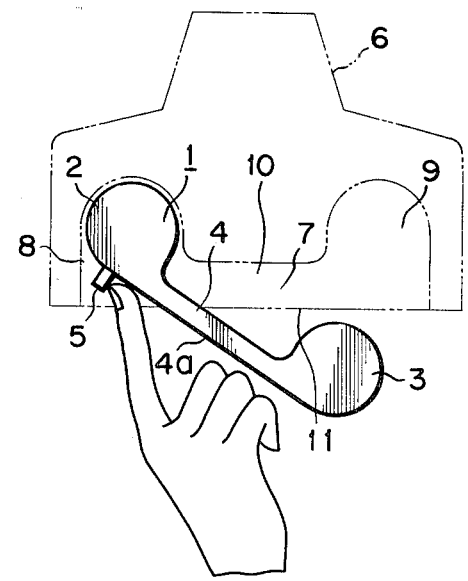

In taking the film cassette 1 of such a construction out of the cassette holder 7 of the camera 6, the ridge 5 exposed at the cassette loading/unloading opening section 11 of the camera 6 is pushed clockwise, or in the direction of the arrow of FIG. 2, by ones finger. When the ridge 5 is pressed in this manner, the film cassette 1 rocks around the first cylindrical body 2, while the peripheral surface of the first cylindrical body 2 is pressed against the peripheral wall surface of the first holding space 8 of the cassette holder 7, as shown in FIG. 3. As a result, the second cylindrical body 3 is forced out of the second holding space 9. The second cylindrical body 3 pushed out of the second holding space 9 in this manner can easily be picked up between the fingers. Thus, the film cassette 1 can be removed from the cassette holder 7 with ease. In setting the film cassette 1 into the cassette holder 7, it is only necessary that the film cassette 1 be pushed into the cassette holder while aligning the first and second cylindrical bodies 2, 3 with the first and second holding spaces 8, 9, respectively. Thus, the loading of the film cassette 1 is not a troublesome task.

Alternative embodiments of the invention may now be described with reference to FIGS. 4 and 5.

Figure 4:
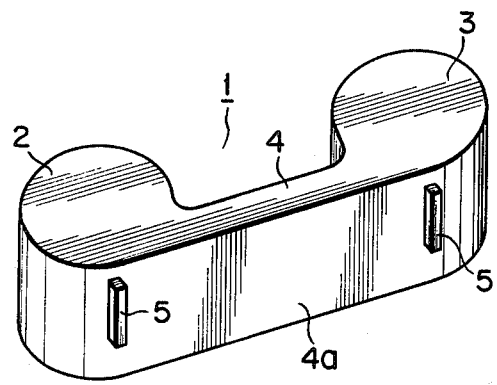
FIGS. 4 and 5 are perspective views of film cassettes according to alternative embodiments of the present invention.
Figure 5:
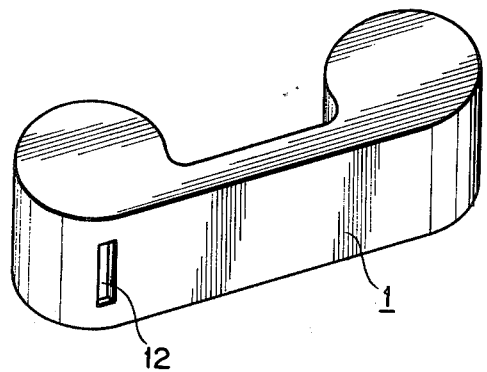

In a film cassette 1 of the embodiment shown in FIG. 4, a ridge 5 forming a catch portion is also provided on the peripheral surface of the second cylindrical body 3, which body 3 forms a film take-up section. In this case, the film cassette 1 can also be rocked around the second cylindrical body 3 with the catch portion 5 thereon, to be taken out of the cassette holder 7. It is to be understood that, in this embodiment, the catch portion 5 need not always be formed on a first cylindrical body 2.

Although the catch portion of the present invention is formed of a ridge within the film cassette; according to the aforementioned embodiments, it may also be formed of any other suitable means that can catch ones finger in such a way as to urge the film cassette to rock. As shown in FIG. 5, for example, the catch portion may be formed of a depression 12. Alternatively, it may be composed of a combination of depressions and projections, or a corrugation.

Although the coupling section is formed of a flat plate which is substantially as high as the cylindrical bodies in the above embodiments, it may be in the form of a bar disposed on the upper or lower side between the cylindrical bodies.

According to the present invention, as described above, a film cassette may be provided which comprises a first cylindrical body forming a film supply section, a second cylindrical body forming a film take-up section, and a coupling section extending between the first and second cylindrical bodies and being connected at both ends to the two cylindrical bodies, thereby coupling the cylindrical bodies, with at least one of the cylindrical bodies having on the outer peripheral surface thereof a catch portion, to which is applied an urging force to rock the film cassette around the cylindrical body with the catch portion thereon.

When a slight amount of force is applied to the catch portion by a finger, the film cassette rocks around one cylindrical body, so that the other cylindrical body projects outwardly from the cassette holder of a camera. Thus, the film cassette can be removed from the cassette holder with ease. The catch portion constitutes no hindrance to film cassette loading and allows for an easy loading operation. Moreover, the construction of the invention need not be complicated.

What is claimed is:

1. A film cassette comprising:
   a first cylindrical body forming a film supply section;
   a second cylindrical body forming a film take-up section; and
   a coupling section extending between the first and second cylindrical bodies and connected at both ends to the two cylindrical bodies, thereby coupling the cylindrical bodies;
   at least one of the cylindrical bodies having a catch portion formed on the outer peripheral surface thereof, to which is applied an urging force to rock the film cassette around that cylindrical body with the catch portion thereon.

2. The film cassette according to claim 1, wherein said coupling section has an outside face continuous with the outer peripheral surfaces of the first and second cylindrical bodies, and said catch portion is formed on that portion of the outer peripheral surface of the first or second cylindrical body which is flush with the outside face of the coupling section.

3. The film cassette according to claim 2, wherein said catch portion includes a ridge protruding from the outer peripheral surface of the cylindrical body.

4. The film cassette according to claim 3, wherein said ridge is integrally formed from a plastic material on the cylindrical body.

5. The film cassette according to claim 2, wherein said catch portion includes a depression formed in the outer peripheral surface of the cylindrical body.

6. The film cassette according to claim 2, wherein said coupling section is formed of a flat plate substantially as high as the cylindrical bodies.

* * * * *